United States Patent Office 2,914,273
Patented Nov. 24, 1959

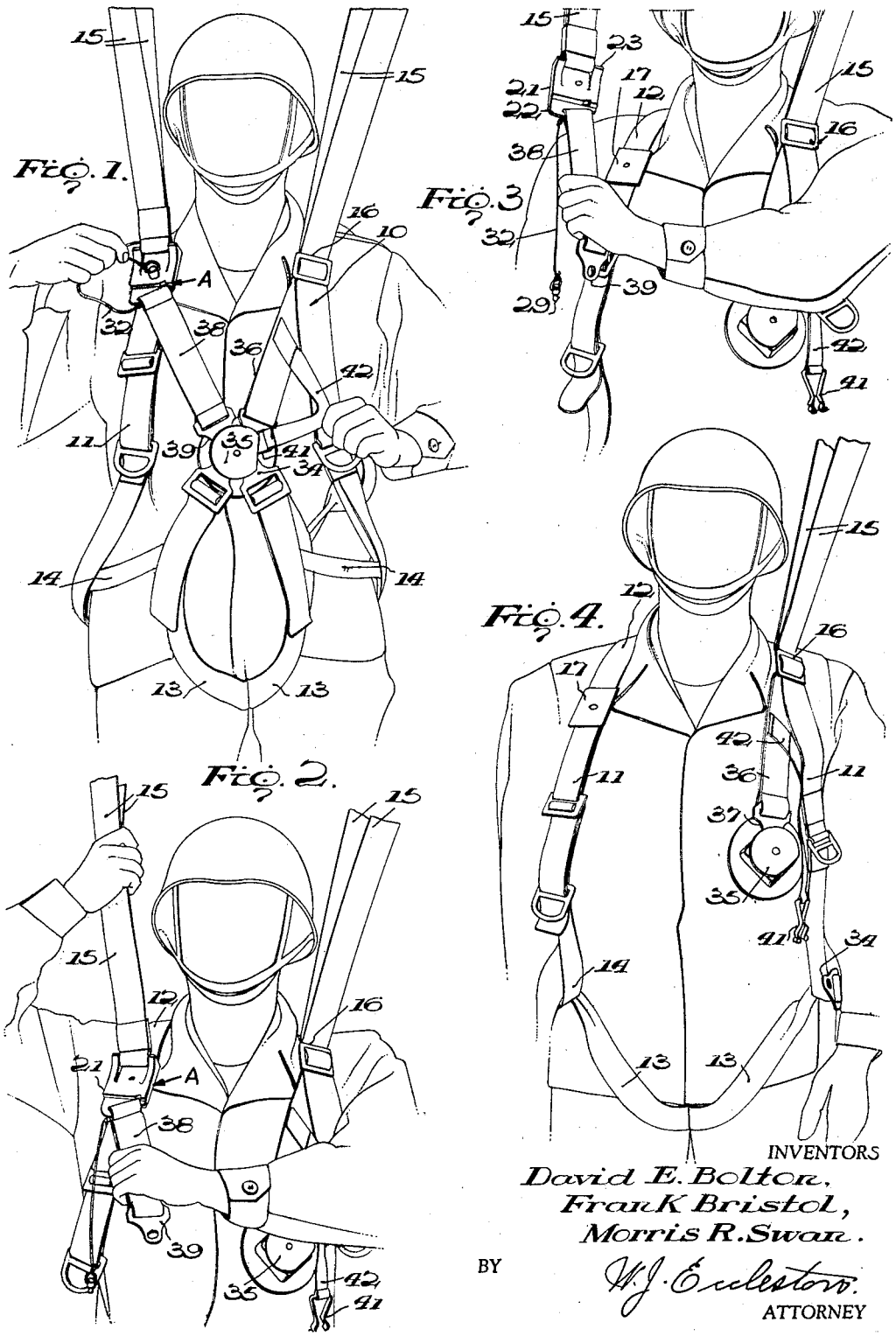

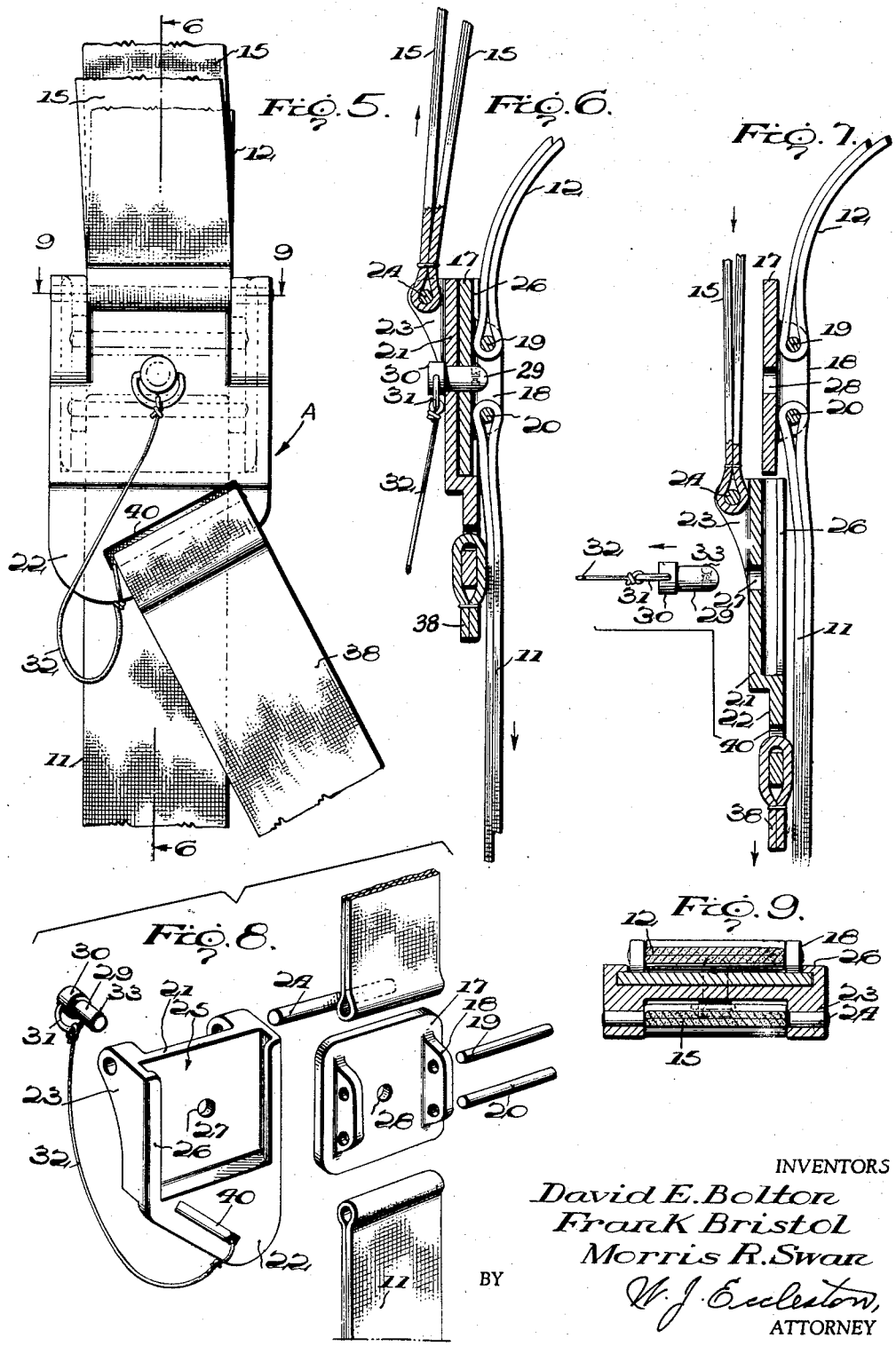

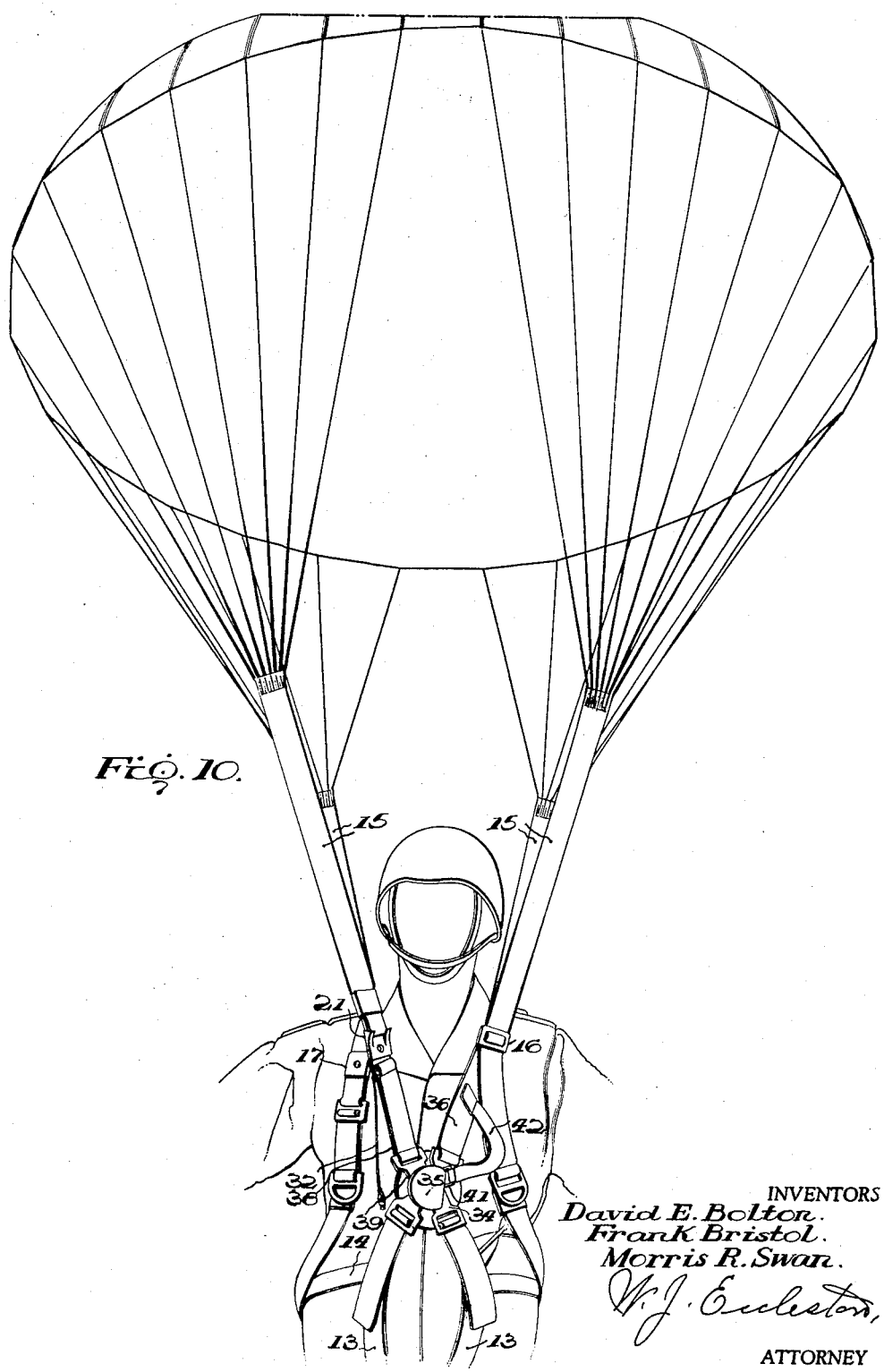

2,914,273

PARACHUTE CANOPY RELEASE

David E. Bolton, Frank Bristol, and Morris R. Swan, United States Army

Application May 17, 1956, Serial No. 585,590

9 Claims. (Cl. 244—151)

(Granted under Title 35, U.S. Code (1952), sec. 266)

The invention described herein, if patented, may be manufactured and used by or for the Government for governmental purposes, without the payment to us of any royalty thereon.

The present invention relates to parachutes and more particularly to release means for connecting the parachute canopy to the harness worn by the parachutist.

In the use of parachutes having the usual connections with the jumper's harness, the jumper disengages himself from the parachute by operating the standard quick-release box to release the four harness straps, and then pulling the shoulder straps down over the shoulders and arms and stepping out of the leg straps. This procedure is very difficult when the wind is blowing, particularly when the jumper is laden with equipment as in the case of paratroopers, as the parachute canopy remains filled with air and drags the jumper along with the wind, often resulting in serious injury.

Numerous quick-release shoulder connections have been designed to spill the air from the canopy by releasing the shroud lines on one side of the canopy from their connection with the jumper's harness, but malfunction of such releases prior to landing resulted in spilling the air from the canopy and dropping the jumper.

An important object of the present invention is the provision of a quick-release connection between the canopy and harness which can be readily operated to spill the air from the canopy when desired but which will maintain a fully inflated canopy if prematurely released.

Another object of the invention is to provide a connection of this character in which movement of the elements of the connection to a release position is in a direction opposite to the direction of the forces exerted upon the connection during opening and descent of the parachute, so that such opening and descent forces maintain the connection in its closed position until such time as the jumper desires to release the canopy.

A further object of the invention is to provide a release device of this character which is of simple and inexpensive construction, strong, durable, efficient and safe in operation, and which can be applied to parachutes and harnesses now in use.

Other objects and advantages of the invention will be apparent during the course of the following description.

In the accompanying drawings, which form a part of this specification and wherein like numerals denote like parts throughout, Figure 1 is a front elevation of a parachute harness shown in place upon a parachutist, the quick-release lift web or riser connection and the standard quick-release box being in locked position as the parachutist prepares to release such connections to spill the air from the canopy so that he can safely remove the harness, Figure 2 is a view similar to Figure 1, showing the quick-release box open, the safety pin removed from the riser connection, and the parachutist about to disengage the parts of the riser connection, Figure 3 is a similar view showing the parts of the riser connection in separated or released position as the parachutist is about to release the riser to spill the air from the canopy, Figure 4 is a similar view showing the position of the parts after one side of the canopy has been completely released to spill the air and permit easy removal of the harness without danger of being dragged by the parachute, Figure 5 is a front elevation of the riser connection in its locked position, showing its connection to the harness straps, to the riser and to the chest strap which leads to the standard quick-release box, Figure 6 is a longitudinal section taken on the line 6—6 of Figure 5, with arrows showing the direction of forces exerted upon the riser connection during opening and descent of the parachute, Figure 7 is a similar view showing the parts of the riser connection as they are separated, with arrows indicating the direction of the force exerted to separate the parts, Figure 8 is an exploded perspective view of the parts of the riser connection, Figure 9 is a cross-sectional view taken on the line 9—9 of Figure 5, and Figure 10 is a perspective view of a parachute and jumper showing the position of the parts when the shoulder quick-release mechanism has been inadvertently operated while still in the air.

In the drawings, wherein for the purpose of illustration is shown a preferred embodiment of the invention, the numeral 10 designates the usual parachute harness which forms no part of the present invention and may be of any suitable construction. Such harness usually has front straps 11, shoulder straps 12, and leg straps 13 passing through loops 14 carried by the front straps 11. Two shroud line riser or lift webs 15 connect one-half of the parachute shroud lines to one of the shoulder straps and front straps, by means of the usual connector 16 shown at the right side of Figures 1 to 4, there usually being one such connector at each shoulder.

In applying the present invention to the harness, one of the connectors 16 is dispensed with and the shoulder strap 12 on the parachutist's right shown at the left of Figures 1 to 4 is connected to the front strap 11 by means of a shoulder quick-release mechanism A which includes an element or slide 17. The slide 17 is in the form of a rectangular plate having slightly rounded corners, and in use assumes a generally vertical position adjacent the wearer's right shoulder as seen in Figures 3 and 4. The back of the plate 17 is provided with a pair of spaced elongated parallel flanges or ears 18 extending along but spaced from the side edges of the plate. A cross-bar 19 is carried by flanges 18 adjacent their upper ends, spaced away from the back of plate 17, and a similar cross-bar 20 connects the lower ends of the flanges 18. The shoulder strap 12 is connected to the upper cross-bar 19, and the front strap 11 is connected to the lower cross-bar 20, as illustrated in Figures 6 and 7.

A lift web or riser adapter comprises a rectangular body portion 21 having a depending generally triangular extension 22. The front of the body portion is provided along its upper side edges with ears 23 which carry a cross-bar 24 to which the riser or lift web 15 is attached. The rear face of the body portion 21 is provided with a recess 25 open at its upper end to receive the slide 17 and provided with overhanging side flanges 26 which prevent removal of slide 17 except through the open upper end of the recess, the lower end of the recess being closed. Body portion 21 is provided centrally with an opening 27 which registers with a similar opening 28 in the slide 17 when the slide is in position within the recess 25 of the riser adapter. A locking pin 29 has an enlarged head 30 in which a small bail 31 is pivotally secured for attachment to a cord 32 secured at its other end to extension 22 to prevent loss of the locking pin. The pin 29 is adapted to be inserted into registering openings 27 and 28, and has a spring pressed ball or projection 33 at its end to prevent accidental removal of the pin from opening 28.

The upper ends of the leg straps 13 are provided with metal eyelets 34 which are received in the standard quick-release box 35. The construction of the box 35 forms no part of the present invention and the box may be of any of the usual types or of any other suitable form, such by way of example as those shown at C in Patent 1,899,656 granted February 28, 1933, to F. S. Wigley et al., and at C in Patent 1,842,611 issued January 26, 1932, to L. L. Irvin. A chest strap such as 36 is usually secured to each connector 16 of the harness and provided with an eyelet 37 to engage the box 35. In the present invention, the right hand chest strap 38 is provided with an eyelet 39 to engage box 35, but in place of being connected to the body harness in the usual way, the chest strap 38 is secured in a diagonal slot 40 in the depending extension 22 of the riser adapter 21, to thereby connect the right hand risers 15 to the quick-release box 35 through the medium of the riser adapter 21. The usual safety fork 41 is removably inserted in the box 35 to prevent movement of the box to its release position, and a flexible web 42 connects the fork 41 to the chest strap 36 to prevent its loss.

By reference to Figures 3 and 7 it will be seen that the shoulder adapter slide 17 connects the right shoulder strap 12 to the right front strap 11, independently of the risers 15 and the quick-release box 35, and that the riser or lift web adapter 21 connects the right hand risers 15 to the right chest strap 38 independently of the shoulder strap 12 and front strap 11, the chest strap 38 being adapted for connection to the quick-release box 35 to connect the risers thereto independently of shoulder adapter 17, strap 12 and strap 11.

In use during descent of the parachutist, the parts will be in the position shown in Figure 1 in which the slide 17 is positioned inside of riser adapter recess 25, as illustrated in Figure 6, and held in place therein by the flanges 26 and by locking pin 29 which is in its operative position within registering openings 27 and 28. The two leg straps 13, chest strap 36 and chest strap 38 are all locked in the standard quick-release box 35 which is locked against inadvertent release by means of safety fork 41. In this assembled position of the parts illustrated in Figures 1, 5 and 6 the forces exerted by the weight of the parachutist during opening and descent of the parachute are in the directions indicated by the arrows in Figure 6, namely down on front strap 11 and shoulder slide 17, and up on risers 15 and riser adapter 21 due to resistance of the parachute to descending movement of the parachutist. These forces combine to urge the slide 17 and adapter 21 towards their closed positions, and no strain is imposed upon the locking pin 29. However, if for any reason the riser adapter 21 should become separated from shoulder slide 17 during descent, the risers 15 would still be connected to the release box 35 through adapter 21 and right chest strap 38 as illustrated in Figure 10 so that the parachute canopy would remain inflated until such time as the parachutist operated release box 35.

With the parts in the position of Figure 1 as the parachutist lands, he first withdraws safety fork 41 from box 35 by pulling upon web 42, then operates release box 35 by rotating the handle in the usual manner, thus releasing straps 13, 36 and 38. In order to spill the air from the canopy it is necessary to remove locking pin 29 by pulling upon cord 32. Chest strap 38 alone or both risers 15 and chest strap 38 together are then grasped as illustrated in Figure 2 and pulled downwardly to remove shoulder adapter 21 from engagement with slide 17, thereby disengaging the two right hand risers 15 from all contact with the body harness, as indicated in Figure 3, whereupon by letting go of the strap 38 the canopy is spilled, as indicated by Figure 4. The parachutist can then disengage himself from the harness without difficulty.

The sequence of operations required to spill the air from the canopy may be varied, but it will be apparent from an inspection of Figures 1 to 4 that both release box 35 and the shoulder canopy release must be actuated before the air is spilled from the canopy. Consequently, the safety of the parachutist is not dependent upon the proper functioning of the shoulder canopy release mechanism. Any suitable release mechanism could be substituted for the standard quick-release box 35 without impairing the effectiveness of the present canopy release, which may obviously also be used with other types of harnesses and other types of parachutes and lift webs, and the parts of which could be reversed with few changes by the expedient of inverting and reversing the riser adapter 21.

While the preferred embodiment of the invention has been shown and described, it is to be understood that various changes may be made in the shape and arrangement of parts without departing from the spirit of the invention or the scope of the subjoined claims.

We claim:

1. The combination with a parachute having lift webs and a body harness including a release box normally securing the harness to the wearer, one of the lift webs being connected to the harness, of a quick-release mechanism connecting another of the lift webs to the body harness, and means connecting said last named lift web to the release box in both release and non-release positions of the quick-release mechanism.

2. The combination with a parachute having lift webs connected to a body harness, of a release box normally securing the harness to the wearer, a quick-release mechanism interposed between one of the lift webs and the harness, and means operatively connecting said release box to said last-mentioned lift web so that release of both the release box and the quick-release mechanism must be accomplished to disconnect said last-mentioned lift web from the harness.

3. The combination with a man-carrying parachute having lift webs and a body harness, of a manually operable release mechanism connecting one of said lift webs to the harness and comprising an adapter connected to the lift web and provided with a recess closed on three sides and open at its top, and a slide carried by the harness and slidably received in the adapter recess, the slide being removable through the open top of the adapter recess, whereby forces exerted upon said slide and adapter during deployment and descent of the parachute are in a direction urging the slide towards the closed lower end of the adapter recess.

4. The combination with a parachute having lift webs and a harness, of a release mechanism connecting one of said lift webs to the harness and comprising an adapter connected to the lift web and provided with a recess closed on three sides and open at its top, a slide element carried by the harness and slidably received in the adapter recess, the slide being removable through the open top of the adapter recess, whereby forces exerted upon said slide and adapter during deployment and descent of the parachute are in a direction urging the slide towards the closed lower end of the adapter recess, a release box normally securing the harness to the wearer, and means connecting the adapter to the release box independently of the slide element.

5. The combination with a parachute having lift webs and a harness, of a release mechanism connecting one of said lift webs to the harness and comprising two interengaging fastening elements relatively movable in opposite directions to engage and disengage the elements, one of said elements being connected to the harness and the other of said elements being connected to said last-mentioned lift web, said connections of the elements to the harness and to the lift web being so arranged that forces exerted upon the elements during deployment and descent of the parachute are in a direction opposite to the direction of movement of the elements required to disengage such elements, a release box normally securing the harness to the wearer, and means linking the lift web-connected fastening element to the release box independently of the harness-connected fastening element.

6. The combination with a man-carrying parachute having lift webs and a body harness, of a manually operable release mechanism connecting one of said lift webs to the harness and comprising an adapter connected to the lift web and provided with a recess closed on three sides and open at its top, a slide element carried by the harness and slidably engaged with the adapter recess, the slide being removable through the open top of the adapter recess, whereby forces exerted upon said slide and adapter during deployment and descent of the parachute are in a direction urging the slide towards the closed lower end of the adapter recess, and a removable locking device engaging the adapter and the slide element in their interengaged position to prevent withdrawal of the slide element from the adapter recess.

7. The combination with a man-carrying parachute having lift webs and a body harness, of a manually operable release mechanism connecting one of said lift webs to the harness and comprising an adapter connected to the lift web and provided on its rear face with a recess closed on three sides and open at its top, there being overhanging flanges on the sides of the recess, a slide element carried by the harness and slidably received in the adapter recess, the slide being removable through the open top of the recess in a direction opposite to the direction of forces exerted upon the slide by deployment and descent of the parachute, said adapter and slide each having openings which register in the assembled position of the adapter and slide, a locking pin receivable in said registering openings, and resilient means normally maintaining the locking pin in position within said openings.

8. The combination with a man-carrying parachute having lift webs and a body harness, of a manually operable release mechanism connecting one of said lift webs to the harness and comprising an adapter connected to the lift web and provided on its rear face with a recess closed on three sides and open at its top, there being overhanging flanges on the sides of the recesss, a slide element carried by the harness and slidably received in the adapter recess, the slide being removable through the open top of the recess in a direction opposite to the direction of forces exerted upon the slide by deployment and descent of the parachute, said adapter and slide each having openings which register in the assembled position of the adapter and slide, a locking pin receivable in said registering openings, resilient means normally maintaining the locking pin in position within said openings, said adapter being provided adjacent its lower end with a depending extension, and a strap attached to said depending extension and serving as a handle for pulling the adapter down out of engagement with the harness slide.

9. The combination with a parachute having lift webs and a harness, of a release mechanism connecting one of said lift webs to the harness and comprising an adapter connected to the lift web and provided on its rear face with a recess closed on three sides and open at its top, there being overhanging flanges on the sides of the recess, a slide element carried by the harness and slidably received in the adapter recess, the slide being removable through the open top of the recess in a direction opposite to the direction of forces exerted upon the slide by deployment and descent of the parachute, said adapter and slide each having openings which register in the assembled position of the adapter and slide, a locking pin receivable in said registering openings, resilient means normally maintaining the locking pin in position within said openings, said adapter being provided adjacent its lower end with a depending extension, a release box normally securing the harness to the wearer, and a strap connecting the depending extension to the release box independently of the slide, said strap also serving as a hand-grip to facilitate pulling of the adapter down out of engagement with the harness slide.

References Cited in the file of this patent

UNITED STATES PATENTS

| | | |
|---|---|---|
| 498,509 | Evans et al. | May 30, 1893 |
| 1,373,013 | Minnis | Mar. 29, 1921 |
| 1,428,358 | Burbery | Sept. 5, 1922 |
| 2,393,072 | Skinner | Jan. 15, 1946 |
| 2,405,333 | Sheridan | Aug. 6, 1946 |
| 2,499,107 | Miller | Feb. 28, 1950 |
| 2,519,352 | Carroll | Aug. 22, 1950 |
| 2,725,204 | Horning | Nov. 29, 1955 |

FOREIGN PATENTS

| | | |
|---|---|---|
| 47,630 | France | Mar. 2, 1937 |
| 389,437 | Great Britain | June 8, 1931 |
| 405,863 | Italy | Sept. 20, 1943 |